(12) United States Patent
Banceanu et al.

(10) Patent No.: US 10,985,668 B2
(45) Date of Patent: Apr. 20, 2021

(54) MODEL BASED CURRENT CONTROL OF A THREE-TO-SINGLE-PHASE POWER CONVERTER

(71) Applicant: ABB Power Grids Switzerland AG, Baden (CH)

(72) Inventors: Cosmin Banceanu, Muri AG (CH); Xinhua Ke, Windisch (CH)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/625,404

(22) PCT Filed: Jun. 21, 2017

(86) PCT No.: PCT/EP2017/065223
§ 371 (c)(1),
(2) Date: Dec. 20, 2019

(87) PCT Pub. No.: WO2018/233822
PCT Pub. Date: Dec. 27, 2018

(65) Prior Publication Data
US 2021/0021202 A1    Jan. 21, 2021

(51) Int. Cl.
*H02M 5/14* (2006.01)
*H02M 5/293* (2006.01)

(52) U.S. Cl.
CPC ............. *H02M 5/14* (2013.01); *H02M 5/293* (2013.01)

(58) Field of Classification Search
CPC ............ H02M 5/00; H02M 5/02; H02M 5/04; H02M 5/10; H02M 5/14; H02M 5/22; H02M 5/257; H02M 5/275; H02M 5/293
See application file for complete search history.

(56) References Cited

U.S. PATENT DOCUMENTS 5,926,382 A * 7/1999 Dahler ..................... B60M 3/00
363/37
5,999,428 A * 12/1999 Dahler ..................... H02M 7/49
363/71

(Continued)

FOREIGN PATENT DOCUMENTS

DE    102009019298 A1   11/2010
EP       1553692 A2     7/2006

OTHER PUBLICATIONS

Chuan et al., "Decoupling Predictive Current Control for Traction Line-Side Converter in High-Speed Railway", 2016 12th World Congress on Intelligent Control and Automation (WCICA), Jun. 12-15, 2016, Guilin, China, IEEE, pp. 1781-1785.

(Continued)

*Primary Examiner* — Adolf D Berhane
(74) *Attorney, Agent, or Firm* — Slater Matsil, LLP

(57) ABSTRACT

A method of an estimator of an inner control loop controlling a three-to-single-phase converter connected to an AC power grid via a transformer includes obtaining a value of a voltage reference uRef produced by the inner control loop for the converter, obtaining a value of a secondary side current produced by the converter and measured between the converter and the transformer, obtaining a value of a primary side current produced by the converter and measured between the grid and the transformer, and obtaining a value of a primary side voltage measured between the grid and the transformer. The method also includes estimating a control current iCtrl component of the primary or secondary side current iMeas which results from the voltage reference, based on the obtained values of the voltage reference, the secondary side current, the primary side current and the primary side voltage, and feeding the estimated control current iCtrl* to the inner control loop.

20 Claims, 3 Drawing Sheets

(56) References Cited

U.S. PATENT DOCUMENTS

| | | | | |
|---|---|---|---|---|
| 6,169,676 | B1* | 1/2001 | Dahler | H02M 7/49 |
| | | | | 363/71 |
| 10,840,822 | B2* | 11/2020 | Buchmann | B60M 3/02 |
| 2005/0015182 | A1* | 1/2005 | Bebic | H02J 3/1842 |
| | | | | 700/286 |
| 2016/0359425 | A1* | 12/2016 | Meyer | C10L 9/10 |
| 2017/0353036 | A1* | 12/2017 | Gil Lizarbe | H02J 3/381 |
| 2019/0288611 | A1* | 9/2019 | Li | H02M 7/53871 |

OTHER PUBLICATIONS

Fan et al., "A Decoupling Control Scheme of High Power Four-quadrant Converters for Traction," Proceedings of the CSEE, vol. 32, No. 21, Jul. 25, 2012, pp. 63-70 (total 9 pages), with an English abstract.

International Preliminary Report on Patentability, dated Sep. 25, 2019, for International Application No. PCT/EP2017/065223.

International Search Report, dated Mar. 19, 2018, for International Application No. PCT/EP2017/065223.

Schrader et al., "Multivariable Control of MMC-based Static Converters for Railway Applications", Electrical Systems for Aircraft, Railway and Ship Propulsion ( ESARS) , 2012, IEEE, pp. 1-6, XP032282737.

Spichartz et al., "State Control of MMC-Fed Ship Propulsion Induction Machine", Electric Ship Technologies Symposium (ESTS), 2013, IEEE, pp. 173-177, XP032419103.

Winkelnkemper et al., "A Modular Direct Converter for Transformer-less Rail Interties", Industrial Electronics (ISIE), 2010, IEEE, pp. 562-567, XP031803419.

Written Opinion of the International Searching Authority, dated Mar. 19, 2018, for International Application No. PCT/EP2017/065223.

\* cited by examiner

MODEL BASED CURRENT CONTROL OF A THREE-TO-SINGLE-PHASE POWER CONVERTER

TECHNICAL FIELD

The present disclosure relates to a method and device for controlling a three-to-single-phase power converter by means of an inner control loop.

BACKGROUND

For railway alternating current (AC) systems, with frequencies like 16.7 Hz, 25 Hz or 50 Hz, static frequency converters (SFC) are used as power supply solution. The active power (P) cannot be stored and has to be continuously controlled and fully transferred through the SFC. Active power control can be achieved by controlling the converter active current flow. Additionally, the voltage (U), reactive power (Q) and frequency (f) of both sides of the converter can be controlled individually.

Usually this controlling is achieved by applying state of the art control methods on both the three-phase (public grid) side and the single-phase (railway grid) side. Based on the known concept of the dq coordinates, a set of outer control loops set appropriate current references that the measured currents is controlled to follow. It is then the task of the inner control loop to decide what is the appropriate amplitude and phase of the converter voltage at the fundamental frequency in order to achieve this current. The actions of the inner control loop can be based on measurements taken either from the secondary side (towards the converter) of the transformer or from the primary side (towards the grid) of the transformer positioned on either side of the converter, between the converter and the three-phase or single-phase grid. Subsequently, the modulator (converter dynamics) synthesizes a converter voltage pulse sequence that has the required characteristics at the fundamental frequency.

In reality, however, the converter voltages actually appearing at the terminals of the converter can never be perfectly matching their theoretical values as set by the references, due to diversities in the switching on or off times of the semiconductor switches in the converter, time resolution issues, etc. This can result in an undesired direct current (DC) flowing through the transformer windings which eventually drives the transformer into saturation, and the protection functions then trip the system.

SUMMARY

To attenuate this undesired effect of saturation of the transformer, an additional control loop is required, that works in parallel with the inner control loop. The two control loops, i.e. the fast inner control loop and the anti-saturation control loop, may be acting on the same signal (the converter voltage pulses) and they both measure the effect of each other's actions in their inputs. This implies that there is a risk that the whole system can become unstable if the two controllers of the control loops continuously try to correct each other's actions.

Moreover, it has been observed that when the current measurement (used in the inner control loop of the converter) is taken from the primary side of the transformer, the oscillatory phenomena get more intense, and only a very tame control can help stabilizing the system. This is due to that the measurement from the primary side may be taken using a current transducer (CT) which has a high pass behaviour, as opposed to the secondary side measurement which may use a CT with a practically all-pass characteristic. However, using a tame control may not be an acceptable solution for e.g. railway intertie (also called rail intertie) applications and therefore another solution may be desired to overcome the above mentioned issues.

In addition to the above mentioned control loops, additional control loops may be used, e.g. to cope with short circuit fault ride through requirements. For railway intertie applications, such requirements are increasing continuously and consequently the traditional control loops may not be fast enough to cope with such requests.

All these control loops/mechanisms acting in parallel may pose a risk for the SFC control performance. Consequently, in order to enable fast inner (closed) loop control on both the three-phase (e.g. public distribution) grid side and the single-phase (e.g. railway) grid side, a decoupling of the parallel loops by means of an estimator is provided.

Thus, in order to cope with continuously growing railway intertie applications requirements, an SFC must be capable of fast and high performance inner (closed) loop control. Due to the complexity of the existing control architecture, the interplay of parallel control loops/mechanisms, have been identified as a potential constraint for the SFC performance. Considering also that CT measurements errors could decrease the inner closed loop control performance even more, a new approach for control is herein presented.

According to an aspect of the present invention, there is provided a method of an estimator of an inner control loop controlling a three-to-single-phase converter connected to an AC power grid via a transformer. The method comprises obtaining a value of a voltage reference produced by the inner control loop for the converter, obtaining a value of a secondary side current produced by the converter and measured between the converter and the transformer, obtaining a value of a primary side current produced by the converter and measured between the grid and the transformer, and obtaining a value of a primary side voltage measured between the grid and the transformer. The method also comprises estimating a control current iCtrl component of the primary or secondary side current which results from the voltage reference, based on the obtained values of the voltage reference, the secondary side current, the primary side current and the primary side voltage, and feeding the estimated control current to the inner control loop.

According to another aspect of the present invention, there is provided a computer program product comprising computer-executable components for causing an estimator to perform an embodiment of the method of the present disclosure when the computer-executable components are run on processing circuitry comprised in the estimator.

According to another aspect of the present invention, there is provided an estimator for an inner control loop controlling a three-to-single-phase converter connected to an AC power grid via a transformer. The estimator comprises processing circuitry, and data storage storing instructions executable by said processing circuitry whereby said estimator is operative to obtain a value of a voltage reference produced by the inner control loop for the converter, obtain a value of a secondary side current produced by the converter and measured between the converter and the transformer, obtain a value of a primary side current produced by the converter and measured between the grid and the transformer, and obtain a value of a primary side voltage measured between the grid and the transformer. The estimator is also operative to estimate a control current component of the primary or secondary side current which results from the voltage reference, based on the obtained values of the voltage reference, the secondary side current, the primary side current and the primary side voltage. The estimator is also operative to feed the estimated control current to the inner control loop.

According to another aspect of the present invention, there is provided a control arrangement for a three-to-single-phase converter. The control arrangement comprises an embodiment of the estimator of the present disclosure, the inner control loop associated with the estimator, and at least one additional control loop configured to control the primary or secondary side current based on measurements thereof.

According to another aspect of the present invention, there is provided a converter arrangement comprising a three-to-single-phase converter, a first transformer connected between the converter and a three-phase grid, a second transformer connected between the converter and a single-phase railway grid, and an embodiment of the control arrangement of the present disclosure.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
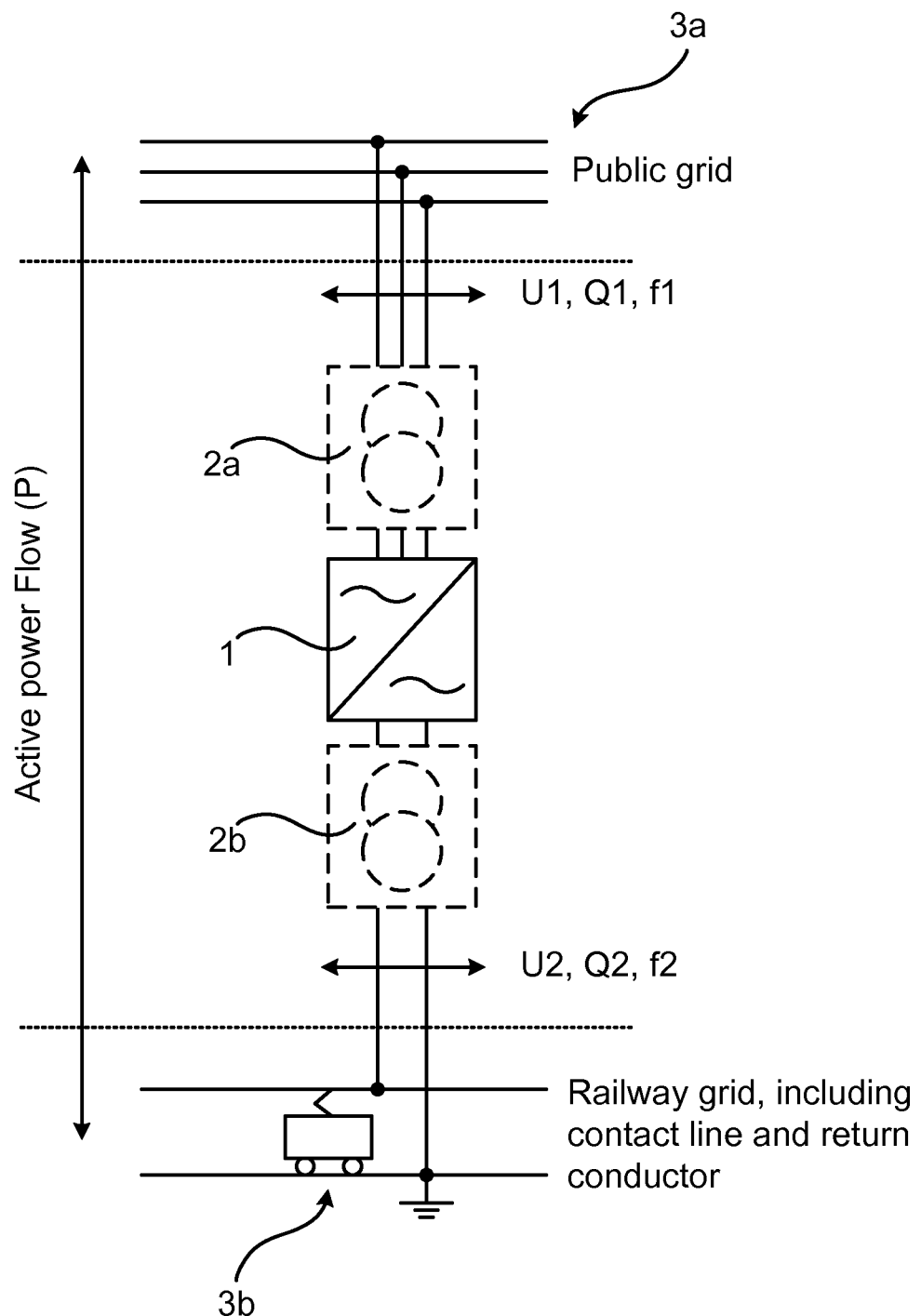
FIG. 1 is a schematic circuit diagram of an embodiment of a converter arrangement comprising a three-to-single-phase converter connected between a three-phase grid and a single-phase grid via respective transformers, in accordance with the present invention.

FIG. 1 illustrates a converter arrangement comprising a three-to-single-phase power converter 1 connected to a three-phase AC grid 3a, e.g. a public/distribution grid, via a first transformer 2a, and connected to a single-phase AC grid 3b, e.g. a railway grid, via a second transformer 2b. The converter may be an SFC, e.g. a Modular Multilevel Converter (MMC) in any suitable configuration such as in a double-star (also called double-Y/wye) configuration. Though an MMC type converter may be preferred with some embodiments of the present invention, other embodiments may be used with other converter types, such as a Neutral-Point Clamped (NPC) converter. The active power P is not stored and is continuously controlled and transferred through the converter, as illustrated by the vertical arrow in the figure. Active power control may be achieved by controlling the converter active current flow. Additionally, either or both of the respective voltages U1 and U2, reactive powers Q1 and Q2 and frequencies f1 and f2 of the three-phase and single-phase sides of the converter 1 may be controlled individually. The frequency f1 of the three-phase grid 3a may e.g. be 50 or 60 Hz, which are examples of frequencies in power distribution grids in different countries. The frequency f2 of the single-phase grid 3b may e.g. be 16.7 Hz (e.g. 50/3 Hz) or 25 Hz, which are examples of frequencies used in railway grids in different countries. Alternatively, the frequency f2 of the single-phase grid may be 50 or 60 Hz, e.g. be the same as the frequency f1 of the three-phase grid 3a.

Figure 2:
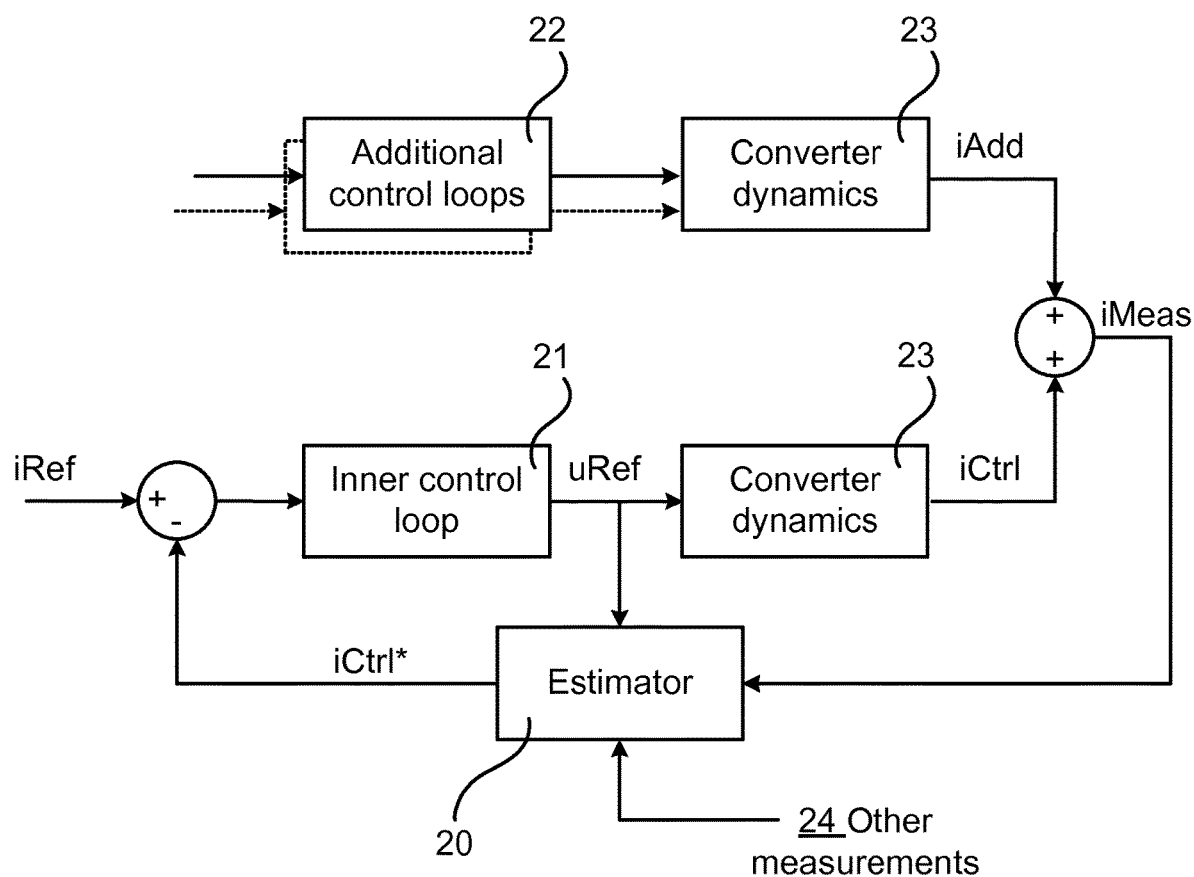
FIG. 2 is a schematic functional block diagram of an embodiment of a control arrangement of a three-to-single-phase converter, in accordance with the present invention.

FIG. 2 illustrates an embodiment of a control arrangement interacting with converter dynamics 23 of a converter 1, in accordance with the present invention. The control arrangement may relate to either of the three-phase or the single-phase side of the converter 1. Typically, two such control arrangements may be used, one for each side of the converter 1. An inner control loop 21, typically a closed control loop, produces a voltage reference uRef based on a current reference iRef and a measured output current iMeas of the converter. iMeas is the measured current at the side of the converter which the control arrangement relates to and may be measured on either the primary or the secondary side of the transformer 2 at that side of the converter 1. The voltage reference is used by the converter dynamics 23, e.g. a modulator, of the converter 1 to produce the control current iCtrl. However, in parallel with the inner control loop 21, additional control loop(s) 22, e.g. comprising a control loop for avoiding saturation of the transformer 2 at the subject converter side, provide other reference(s) to the same converter dynamics 23, resulting in an additional current iAdd outputted from the converter. Thus, the total current outputted from the converter, at the subject side of the converter, and measured as iMeas is $$iMeas = iCtrl + iAdd.$$

Thus, the measured current iMeas that is used in the inner control loop 21 contains also the components iAdd generated by the additional control loops 22. Such additional current components iAdd cannot be easily measured since they are the result of altering the modulator 23 voltages.

It is therefore desirable to separate the inner control loop 21 from the additional control loops 22, closing the inner control loop independently of the additional control loops 22, thus allowing a stable operation for measurements both on the primary and the secondary side of the transformer 2 with the inner control aggressively tuned. An approach is to estimate the additional current components iAdd resulting from the additional control loops 22. The principal concept of the decoupling of the parallel control loops 21 and 22 may then be to subtract from the inner control loop 21 measured input iMeas the estimated components iAdd* (the asterisk indicating that it is an estimation rather than real/measured current component) from the other loops 22 to achieve the estimated control current iCtrl* by the subtraction iCtrl*=iMeas−iAdd*.

However, such an approach may result in a high number of inputs/measurements for the estimator 20 and a state space model used may increase drastically, and consequently also the number of parameters to tune increases as well. Thus, for this approach the focus is on estimating the additional components iAdd, and in order to do so a lot of other signals are estimated even if they are not necessarily useful.

It is worth mentioning that, the complexity of the state space model plays a role in terms of processor load of the control arrangement. Since the estimator 20 reacts on the fast inner control loop 21, it may have to have the same sampling period. Therefore, having a complex state space model on a faster task may not be feasible due to the processor load limitations.

Moving the estimator 20 to a slower sampling period in order to decrease the load on its processor may generate other problems such as:

low resolution of the estimated currents (e.g. sampling time/period might be too long for estimation of a 50 Hz signal);

delays should be considered such that all measurements which are inputs in the estimator block should have the same time stamp.

Due to the above mentioned problems, such decoupling of the parallel control loops 21 and 22 may not be suitable for railway interties applications. Based on that, a new approach is considered where the control component iCtrl, instead of the additional component iAdd, of the measured current iMeas is directly estimated as iCtrl* by the estimator 20, as shown in FIG. 2, in order to avoid as many unnecessary states as possible. There is thus no need to estimate the additional current component iAdd.

Thus, in accordance with embodiments of the present invention, the estimated control current iCtrl* is calculated by the estimator 20 based on the measured output current iMeas, the voltage reference uRef from the inner control loop 21 and some other measurements 24. As further discussed in relation to FIG. 3 (below), the other measurements 24 may include voltages uG, e.g. one voltage per phase of the grid 3, at a Point of Common Coupling (PCC) with the grid 3, i.e. at the primary side of the transformer 2. Also, the estimator 20 may use current measurements iG and ig from both the primary and secondary sides of the transformer 2. Thus, if iMeas is measured at the primary side of the transformer (being the same as iG), the measured current ig at the secondary side of the transformer is included in the other measurements 24. Conversely, if iMeas is measured at the secondary side of the transformer (being the same as ig), the measured current iG at the primary side of the transformer 2 is included in the other measurements 24. It follows that iMeas may be either iG or ig, which implies that the control current iCtrl and the additional current component iAdd may be components of the measured current iMeas either at the primary side or the secondary side of the transformer 2. If a filter 31 is used, a measured current iFil of said filter may be included in the other measurements 24.

The estimated control current iCtrl* is then compared with the current reference iRef to obtain the difference there between as an error, and the inner control loop 21 adjusts the voltage reference uRef in order to minimize this error. The error is then only related to the difference between the current reference iRef and the component iCtrl of the converter output current ig or iG which is resultant from the voltage reference uRef, independent on any additional current components iAdd of the measured output current iMeas.

The estimator 20 may thus be simplified where no inputs are considered from any additional control loops 22. Also, any measurement errors may be ignored. Further, what is estimated by the estimator 20 may be regarded as the current flow into the circuit, and since the above mentioned additional current component(s) iAdd are not considered, the estimated current iCtrl* is an estimation of only the control loop component iCtrl of the measured output current iMeas.

Figure 3:
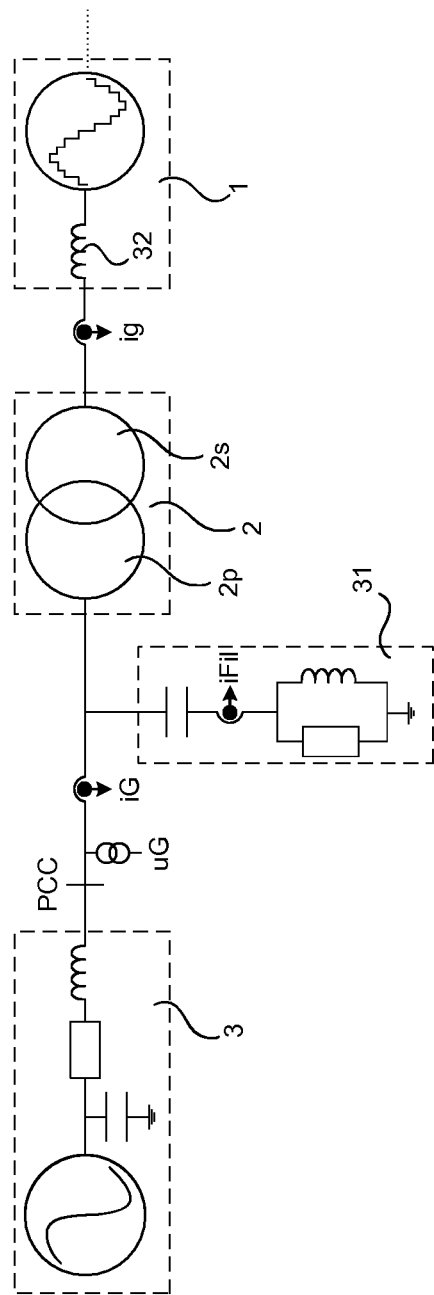
FIG. 3 is a schematic circuit diagram in more detail of one side of a converter arrangement comprising a three-to-single-phase converter connected between a three-phase grid and a single-phase grid via respective transformers, in accordance with embodiments of the present invention.

FIG. 3 illustrates one side of the converter arrangement, between the converter 1 and the grid 3, which may be either of the three-phase grid 3a or the single-phase grid 3b, via the transformer 2. Also, only one phase is shown while any number of 1-3 phases may be present, depending on the topology/configuration of the three-to-single-phase converter 1. The converter 1 comprises a phase leg reactor 32 for each phase, via which the converter is connected with the transformer 2. The transformer 2 has a primary side 2p towards the grid 3, and a secondary side 2s towards the converter 1. An optional filter 31 may be connected to each phase between the transformer and the PCC with the grid 3, typically between the transformer and the position(s) where the PCC voltage uG and/or the primary side current iG are measured.

The simplified estimator 20 may use the following:

as inputs: the voltage references uRef to the modulator 23 from the inner control loop 21 and the voltages uG at the PCC where the grid 3 connects to the converter arrangement;

as measurements: the primary side currents iG of each phase at the primary side 2p of the transformer 2 (i.e. between the transformer 2 and the PCC, e.g. between the filter 31, if used, and the PCC), secondary side currents ig of each phase at the secondary side 2s of the transformer (i.e. between the transformer 2 and the converter 1) and filter currents (iFil, if a filter 31 is used, e.g. connected between the transformer 2 and the PCC);

as state space model: may use a simplified equivalent impedance model that includes the grid 3 (and cables between PCC and transformer 2), filter 31, power transformer 2 and phase leg reactors 32 (for direct SFCs).

A state space model for estimations by an estimator is generally well-known in the art. The difference between the different measured parameters called "inputs" and "measurements" relate to the common nomenclature relating to state space models, in which the inputs are states in the model and the measurements relate to measurement equations of said model.

Some advantages of embodiments of the present invention may include any of:

1. Processor load saving: comparing with the approach of estimating iAdd, from the number of parameters point of view the new estimator state space model is substantially smaller. Therefore, the load on the processor is no longer a problem and the estimator 20 may be used directly in the fastest task/sampling period available.

2. Simplified tuning procedure: since the number of states is reduced, tuning of the estimator 20 is significantly simplified;

3. The estimator 20 may be independent of the current measurement iMeas position: with the classical approach, two different estimators are needed to be implemented based on the placement of the current measurement: primary side or secondary side of the transformer 2. With the new approach, the same estimator 20 may be used for both instances.

4. It is no longer necessary to know or calculate the high-pass behaviour of the CT.

5. The additional control loops 22 may be ignored by the estimator 20: consequently, for newly introduced or changed additional parallel loops 22, the estimator 20 may remain unchanged.

6. The same estimator 20 design may be used for all transformer 2 topologies: it may no longer be necessary to rewrite the partial derivative equations based on the transformer topology.

Figure 4:
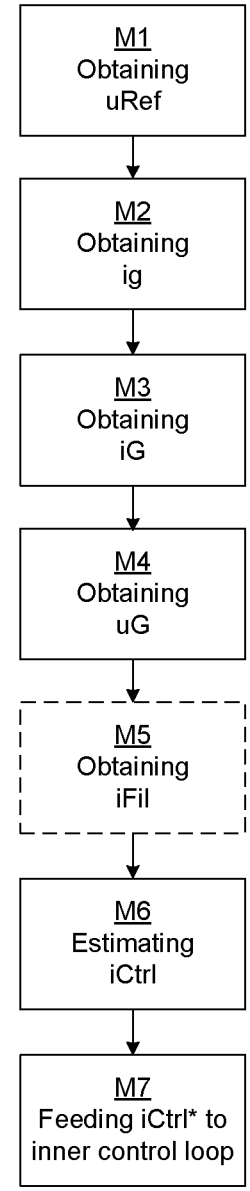
FIG. 4 is a schematic flow chart of an embodiment of a method of the present invention.

FIG. 4 is a schematic flow chart illustrating some embodiments of the method of the present invention. The method is performed in/by the estimator 20 of the inner control loop 21 which is controlling the three-to-single-phase converter 1 connected to an AC power grid 3 via a transformer 2. The converter, being a three-to-single-phase converter, is typically connected to both the three-phase grid 3a (via the first transformer 2a) and the single-phase grid 3b (via the second transformer 2b). However, the method is only concerned with the control of either one of the three-phase or the single-phase side of the converter, the AC power grid 3 thus being either the three-phase grid 3a connected via the first transformer 2a, or the single-phase grid 3b connected via the second transformer 2b.

The estimator obtains (M1-M4/M5) values of some variables/properties of the side of the converter controlled by the inner control loop 21 with which the estimator is associated. However, it should be noted that, although not further discussed here, the same estimator 20 may be used also for a corresponding inner control loop 21 for the other side of the converter, the estimator being associated with the inner control loops 21 of both the three-phase and the single-phase sides of the converter 1. The values may be obtained e.g. from sensors arranged to perform measurements of the variables/properties, typically in real-time with the same sampling rate/period as the estimator 20.

Thus, the method comprises obtaining M1 a value of the voltage reference uRef produced by the inner control loop for the converter, obtaining M2 a value of the secondary side current ig produced by the converter and measured between the converter 1 and the transformer 2, obtaining M3 a value of the primary side current iG produced by the converter and measured between the grid 3 and the transformer 2, and obtaining M4 a value of a primary side voltage uG measured between the grid 3 and the transformer 2. Optionally, the method may also comprise obtaining M5 a value of a filter current (iFil) in a filter 31 connected to primary side 2p of the transformer 2, between the transformer and the grid 2.

The obtained (M1-M4/M5) parameter values are then used for estimating M6 a control current iCtrl component of the primary or secondary side current iG or ig which results from the voltage reference uRef. The estimated control current iCtrl* is then fed M7 to the inner control loop 21. Thus, any additional component iAdd of the primary or secondary side current iG or ig (i.e. the measured output current iMeas) is not included in the estimated control current iCtrl*, not allowing it to influence the calculation of the voltage reference uRef by the inner control loop 21.

Embodiments of the method of the present invention may be performed by a control arrangement of the converter 1, e.g. by the estimator 20 thereof, which control arrangement/estimator comprises processing circuitry associated with data storage. The processing circuitry may be equipped with one or more processing units CPU in the form of microprocessor(s) executing appropriate software stored in associated memory for procuring required functionality. However, other suitable devices with computing capabilities could be comprised in the processor, e.g. an application specific integrated circuit (ASIC), a field programmable gate array (FPGA), a complex programmable logic device (CPLD), etc., in order to control the converter 1 and perform embodiments of the method of the present disclosure, while executing appropriate software, e.g. stored in a suitable data storage, such as a RAM, a Flash memory or a hard disk, or in the processing circuitry itself (as e.g. in case of an FPGA).

Embodiments of the present invention may be conveniently implemented using one or more conventional general purpose or specialized digital computer, computing device, machine, or microprocessor, including one or more processors, memory and/or computer readable storage media programmed according to the teachings of the present disclosure.

Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/-in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), FPGA or any type of media or device suitable for storing instructions and/or data. In some embodiments, the data storage of the control arrangement or the estimator 20 may be a computer program product as discussed herein.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of an estimator of a closed inner control loop controlling a three-to-single-phase converter connected to an AC power grid via a transformer, for decoupling the inner control loop from at least one parallel additional control loop, the method comprising:
   obtaining a value of a voltage reference produced by the inner control loop for the converter;
   obtaining a value of a secondary side current produced by the converter and measured between the converter and the transformer;
   obtaining a value of a primary side current produced by the converter and measured between the grid and the transformer;

obtaining a value of a primary side voltage measured between the grid and the transformer;

estimating a control current component of the primary or secondary side current that results from the voltage reference, the control current being estimated based on the obtained values of the voltage reference, the secondary side current, the primary side current and the primary side voltage; and feeding the estimated control current to the inner control loop.

2. The method of claim 1, wherein the AC power grid is a single-phase railway grid.

3. The method of claim 1, wherein the AC power grid is a three-phase grid.

4. The method of claim 1, wherein the converter is comprised in a railway intertie.

5. The method of claim 1, wherein the converter is a Modular Multilevel Converter.

6. The method of claim 1, further comprising:
obtaining a value of a filter current in a filter connected to primary side of the transformer, between the transformer and the grid;
wherein the control current is estimated based also on said obtained filter current.

7. The method of claim 1, wherein the value of the secondary side current is obtained by means of a current transducer with an all-pass characteristic.

8. The method of claim 1, wherein the value of the primary side current is obtained by means of a current transducer with a high-pass behavior.

9. The method of claim 1, wherein the at least one parallel additional control loop comprises an anti-saturation control loop.

10. The method of claim 1, wherein estimating the control current component includes estimating an additional current component of the at least one parallel additional control loop and subtracting the estimated additional current component from a measured current corresponding to either the primary side current or the secondary side current.

11. A computer program product embodied on a non-transitory computer readable medium and comprising computer-executable components for causing an estimator to perform a method of an estimator of a closed inner control loop controlling a three-to-single-phase converter connected to an AC power grid via a transformer for decoupling the inner control loop from at least one parallel additional control loop, when the computer-executable components are run on processing circuitry comprised in the estimator, the method comprising:

obtaining a value of a voltage reference produced by the inner control loop for the converter;

obtaining a value of a secondary side current produced by the converter and measured between the converter and the transformer;

obtaining a value of a primary side current produced by the converter and measured between the grid and the transformer;

obtaining a value of a primary side voltage measured between the grid and the transformer;

estimating a control current component of the primary or secondary side current that results from the voltage reference, the control current being estimated based on the obtained values of the voltage reference, the secondary side current, the primary side current and the primary side voltage; and feeding the estimated control current to the inner control loop.

12. The method of claim 2, wherein the converter is comprised in a railway intertie.

13. The method of claim 3, wherein the converter is comprised in a railway intertie.

14. The method of claim 2, wherein the converter is a Modular Multilevel Converter.

15. The method of claim 3, wherein the converter is a Modular Multilevel Converter.

16. The method of claim 4, wherein the converter is a Modular Multilevel Converter.

17. The method of claim 2, further comprising:
obtaining a value of a filter current in a filter connected to primary side of the transformer, between the transformer and the grid;
wherein the control current is estimated based also on said obtained filter current.

18. An estimator for a closed inner control loop controlling a three-to-single-phase converter connected to an AC power grid via a transformer, for decoupling the inner control loop from at least one parallel additional control loop, the estimator comprising:
processing circuitry; and
data storage storing instructions executable by said processing circuitry whereby said estimator is operative to:
obtain a value of a voltage reference produced by the inner control loop for the converter;
obtain a value of a secondary side current produced by the converter and measured between the converter and the transformer;
obtain a value of a primary side current produced by the converter and measured between the grid and the transformer;
obtain a value of a primary side voltage measured between the grid and the transformer;
estimate a control current component of the primary or secondary side current that results from the voltage reference, the control current component being estimated based on the obtained values of the voltage reference, the secondary side current, the primary side current and the primary side voltage; and
feed the estimated control current to the inner control loop.

19. A control arrangement for a three-to-single-phase converter, the control arrangement comprising:
the estimator of claim 18;
the inner control loop associated with the estimator; and
the at least one parallel additional control loop configured to control the primary or secondary side current based on measurements thereof.

20. A converter arrangement comprising:
a three-to-single-phase converter;
a first transformer connected between the converter and a three-phase grid;
a second transformer connected between the converter and a single-phase railway grid; and
the control arrangement of claim 19.

* * * * *